(12) United States Patent
Reynolds

(10) Patent No.: US 6,799,895 B2
(45) Date of Patent: *Oct. 5, 2004

(54) CARTRIDGE-TYPE THRUST BEARING

(75) Inventor: Warren C. Reynolds, Orange, CA (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/302,155

(22) Filed: Nov. 22, 2002

(65) Prior Publication Data
US 2003/0072507 A1 Apr. 17, 2003

Related U.S. Application Data

(63) Continuation-in-part of application No. 09/764,474, filed on Jan. 17, 2001, now Pat. No. 6,485,181.
(51) Int. Cl.$^7$ ................................................ F16C 17/04
(52) U.S. Cl. ...................................... 384/304; 384/613
(58) Field of Search ................................ 384/304, 613, 384/124, 303, 307

(56) References Cited

U.S. PATENT DOCUMENTS

| 3,384,428 A | 5/1968 | Hodge |
| 3,602,558 A | 8/1971 | Reynolds |
| 3,716,244 A | 2/1973 | Hellwig |
| 3,748,001 A | 7/1973 | Neumann et al. |
| 3,986,752 A | 10/1976 | Bogar et al. |
| 4,030,787 A | 6/1977 | Brogan et al. |
| 4,033,647 A | 7/1977 | Beavers |
| 4,553,858 A | 11/1985 | Neugebauer et al. |
| 4,554,983 A | 11/1985 | Obrecht |
| 4,596,475 A | 6/1986 | Pannwitz |
| 4,872,768 A | 10/1989 | Brandenstein et al. |
| 5,169,245 A | 12/1992 | Harada et al. |
| 5,531,526 A | 7/1996 | Labedan et al. |
| 5,564,836 A | 10/1996 | Ide et al. |
| 5,584,585 A | 12/1996 | Premiski et al. |
| 5,611,628 A | 3/1997 | Brouwer |

Primary Examiner—Lenard A. Footland
(74) Attorney, Agent, or Firm—Franklin Gubernick

(57) ABSTRACT

Disclosed is a self-lubricating thrust bearing having a number of axially-aligned parts. The bearing is preferably in cartridge form and includes an internal circular spring. The spring is located between two adjacent disks and functions to force the disks apart when the bearing loading is below a predetermined amount. In this manner, when the bearing loading is low, the spring applies pressure to the bearing's components and any attached structure. When the bearing loading exceeds a predetermined amount, the spring becomes compressed sufficiently to enable direct contact between the disks while not interfering with the rotational movement of any part of the bearing. The spring can be made of any resilient material, such as spring steel or an elastomer. The bearing may also include a grease injection system that can apply a coating of grease to predetermined surfaces within the bearing or adjacent the bearing to thereby mitigate corrosion of the bearing and attached structure, as well as to help prevent the entry of unwanted material into the bearing.

27 Claims, 7 Drawing Sheets

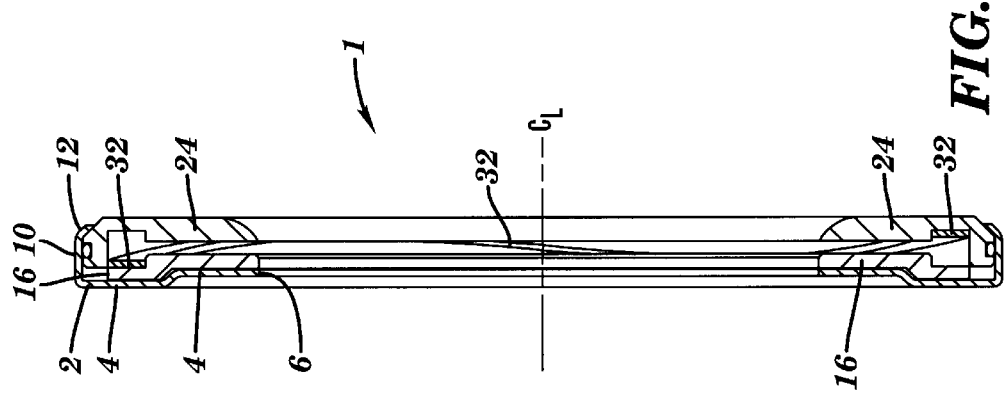
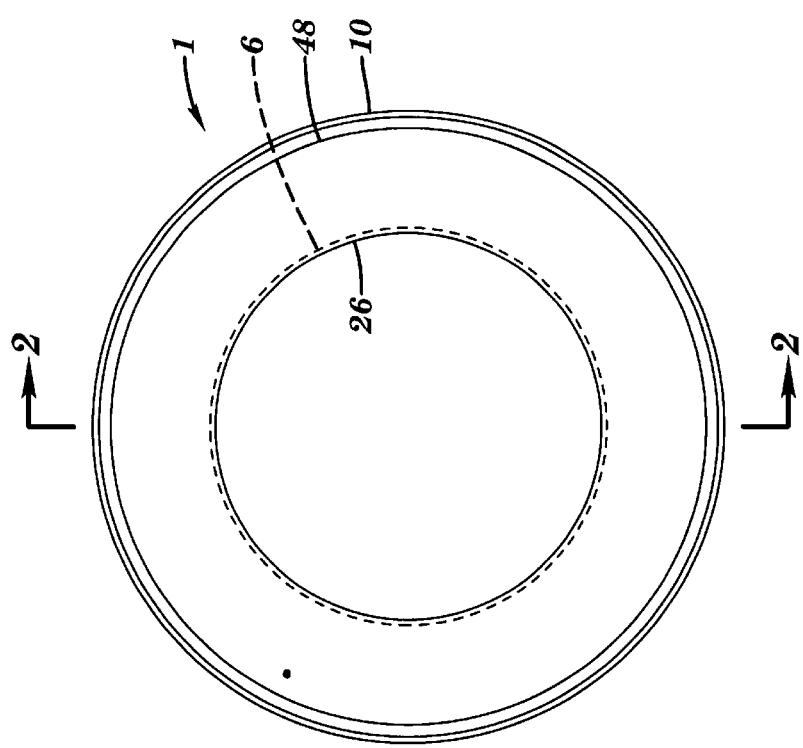

CARTRIDGE-TYPE THRUST BEARING

This application is a Continuation-In-Part of application 09/764,474, filed Jan. 17, 2001, now U.S. Pat. No. 6,485,181.

FIELD OF THE INVENTION

The invention is in the field of bearings. More particularly, the invention is a self-lubricating thrust bearing having a plurality of axially-aligned parts. The bearing is preferably in cartridge form and includes an internal circular spring. When the bearing loading is low, the spring expands and urges the bearing's mating surfaces together, while also causing a positive contact between the bearing and the structure to which it is secured. Once the bearing loading exceeds a predetermined amount, the spring's location and extent of compression prevent it from interfering with the rotational movement of any portion of the bearing.

BACKGROUND OF THE INVENTION

Bearings are often employed in structures that are subject to variable loading. In some situations, the loading of the bearing will range from zero to an extreme amount. Throughout the entire load range, the bearing must maintain its structural integrity and preferably also maintain positive contact with adjacent structure. In addition, the amount of load acting on the bearing, in combination with the bearing's design, can affect the performance characteristics of the structure in which the bearing is installed.

One example of a structure having a bearing subject to extreme variations in loading is found in the nose landing gear of an airplane. The nose landing gear, also herein referred to as the nose gear, includes the plane's front wheel(s) and a strut assembly that attaches the wheel(s) to the plane. To facilitate turning of the wheel(s), the strut assembly includes a bearing having relatively rotatable portions. When the plane is on the ground, a significant loading of the bearing is normally present due to the portion of the plane's weight carried by the nose gear. During and immediately after take off, the load applied to the bearing due to the wheel's contact with the ground ranges from significant to essentially zero. During a landing, the bearing loading may also vary significantly. To enable precise wheel movements, the bearing must allow smooth rotation without a significant amount of play. The bearing must also be durable and capable of functioning in an environment subject to water, dust and/or other materials often found on the runways of any airport.

Vibration is a problem sometimes associated with structures subject to variable/cyclical loading. In an airplane, the nose gear may experience unwanted vibration during the final stages of a take-off. This occurs as the load due to the wheel's contact with the runway becomes reduced to essentially zero immediately after take-off. A similar intermittent/reduced loading of the nose gear can occur during landings. Any unbalance in the nose gear's wheel(s), as well as forces applied by the air stream, may cause vibration in the structural elements of the nose gear that can be transmitted to the plane's steering and suspension systems, the airframe and to the plane's occupants.

Another problem sometimes associated with structures subject to variable loading is that when the loading becomes reduced to essentially zero, any bearing in the structure may lose positive contact with the surfaces to which it is normally engaged. The lack of positive contact may produce openings into which contaminants may enter. These contaminants can adversely affect the bearing and any adjacent structure.

SUMMARY OF THE INVENTION

The invention is a self-lubricating thrust bearing having a plurality of axially-aligned parts. The bearing is preferably in cartridge form and includes first and second bearing surfaces that are preferably separated by a quantity of lubricating material. Bearing surfaces function to transfer force from one rotatable member to another member through either direct contact, or indirect contact via, for example, a quantity of lubricating material, a plurality of balls (in a ball bearing) or a plurality of rollers (in a roller bearing). The first bearing surface forms a center portion of a first thrust member that extends outwardly of, and wraps about a peripheral beveled surface of a second thrust member that includes the second bearing surface.

Unlike prior art bearings, the second bearing surface is incorporated into a multi-part thrust assembly that features a circular spring sandwiched between the second thrust member and a third thrust member. The spring functions to apply a load to the bearing surfaces irrespective of any exterior loading on the bearing. When the external loading is very low, the spring expands the bearing structure in a direction parallel to the bearing's axis, thereby assuring positive contact with, and preferably applying a load to, any structure mated to the first and third thrust members of the bearing. As the bearing becomes loaded by external force(s), the spring becomes compressed to an extent whereby it no longer separates the thrust members of the thrust assembly. Once they contact each other, friction between the thrust assembly's two thrust members is greater than between the first and second bearing surfaces, thereby causing the thrust assembly's thrust members to essentially lock together in a substantially slippage-free engagement. The thrust assembly then acts as a single member and allows the bearing to operate in a conventional manner.

In a first embodiment of the invention, the spring is in the form of a circular wave washer. The washer is preferably at least partially received within an annular groove in one of the thrust members that sandwich the spring. In a second embodiment of the invention, the spring is in the form of a ring of elastomeric material. By selecting a suitable spring rate for the spring, the spring will act to dampen unwanted vibrations created by connected structure, such as an unbalanced wheel of an aircraft's nose gear.

The ability for low load conditions to create vibration in the bearing and/or the structure connected to the bearing is mitigated by the force applied by the bearing's internal spring to the bearing's components and to any attached structure. When the bearing is employed in an airplane's nose gear, the bearing functions to minimize or dampen the vibrations that may occur during takeoffs and landings and thereby possibly reduce vibration in the plane's steering and suspension components and minimize the need to replace the plane's tires.

As an option in either embodiment of the invention, one or more o-rings may be employed within the bearing to prevent entry of foreign matter into the unit. A second option that may be employed in either embodiment of the invention is for the bearing assembly to include exterior-viewable indicia that facilitates a user's ability to determine the amount of preload acting on the bearing and/or bearing wear. A third option that may be employed in either embodiment of the invention is a grease injection system that can be used to apply grease to interior and/or exterior portions of the bearing. The grease will then function to inhibit corrosion of the bearing and of surfaces adjacent the bearing. The grease can also function to prevent the entry of unwanted material into the bearing.

BRIEF DESCRIPTION OF THE DRAWINGS

FIG. 1 is a front view of a first embodiment of a bearing assembly in accordance with the invention.

FIG. 2 is a cross-sectional side view of the bearing assembly shown in FIG. 1, taken at the plane indicated by 2—2.

DETAILED DESCRIPTION OF THE DRAWINGS

Figure 3:
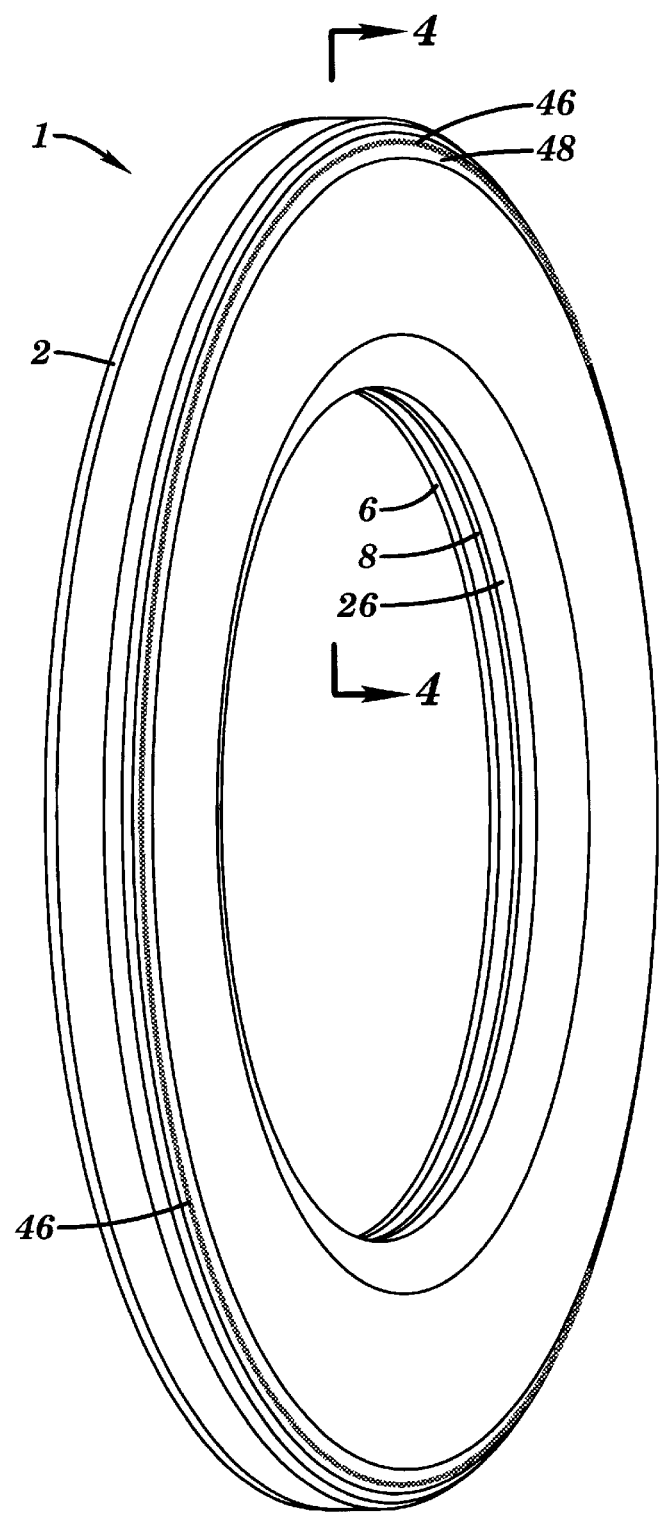
FIG. 3 is a perspective view of the bearing assembly shown in FIG. 1.

Referring now to the drawings in greater detail, wherein like reference numbers refer to like parts throughout the several figures, there is shown by the numeral 1 a first embodiment of a bearing assembly in accordance with the invention.

FIGS. 1–6 provide various views of the bearing assembly 1. As can be easily seen in FIG. 2, the bearing assembly is composed of a plurality of separate elements that are concentric about the assembly's center axis (denoted by the dotted centerline shown in the figure). In the preferred embodiment, the combined elements are secured together to form a cartridge that may be easily handled as a single unit.

A substantially disk-shaped first thrust member 2 forms a rear face and the outer sidewall of the assembly 1 and has an outer shape designed to mate with external structure. The thrust member includes a center portion 4 having a center-located thru-hole defined by edge 6. A compound interior-facing surface 8 (note FIG. 4) of portion 4 forms a first bearing surface located within the assembly. The thrust member 2 includes a peripheral portion 10 that forms the sidewall of the assembly and extends rearwardly away from the member's center portion 4. The peripheral portion 10 includes a tip portion 12 that extends inwardly at an angle toward the bearing assembly's center axis. In the preferred embodiment, the thrust member 2 is made of a metal material, such as steel.

Facing surface 8 of thrust member 2 is another compound bearing surface 14. Surface 14 is complementary in shape to surface 8 and forms a face of a disk-shaped, rigid second thrust member 16. The second thrust member has a center-located thru-hole defined by edge 18 and forms a front portion of a thrust ring assembly 20.

Two circular pads 22 of a lubricating material, preferably a synthetic fluorine-containing resin material such as TEFLON, are preferably bonded to surface 14 and are sandwiched between surfaces 8 and 14. Alternatively, the pads 22 may be bonded to surface 8, or merely positioned so as to be located between said surfaces 8 and 14. The pads prevent direct contact between said surfaces and act as a lubricant to minimize wear and torsional friction when either of said surfaces rotates relative to the other of said surfaces. It should be noted that as another alternative, a lubricating material that is not in pad form, such as grease or oil, may be employed in lieu of the self-lubricating pads 22. While the use of a quantity of lubricating material is preferred, certain conditions or material choices may make the use of a lubricant unnecessary.

Located adjacent the second thrust member 16 is a rigid, disk-shaped third thrust member 24 that forms a back portion of the thrust ring assembly, as well as the front face of the bearing assembly 1. Thrust member 24 features a center-located thru-hole defined by edge 26. An interior-facing surface 28 of thrust member 24 is complementary in shape to a rear surface 30 of the second thrust member 16.

Figure 4:
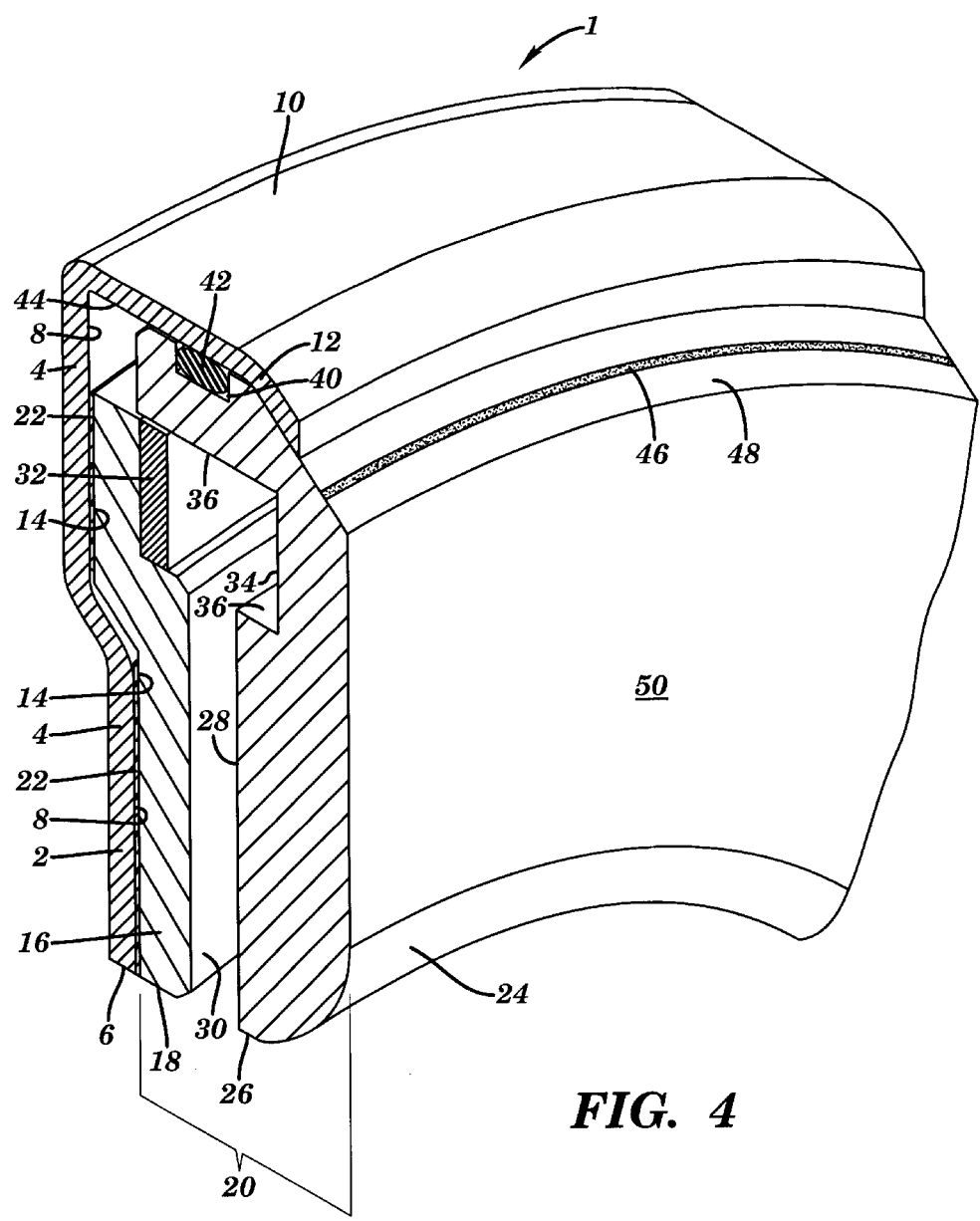
FIG. 4 is a detailed, cross-sectional perspective view of a top, representative portion of the bearing assembly shown in FIG. 3, taken at the plane indicated by 4—4 in FIG. 3.
Figure 5:
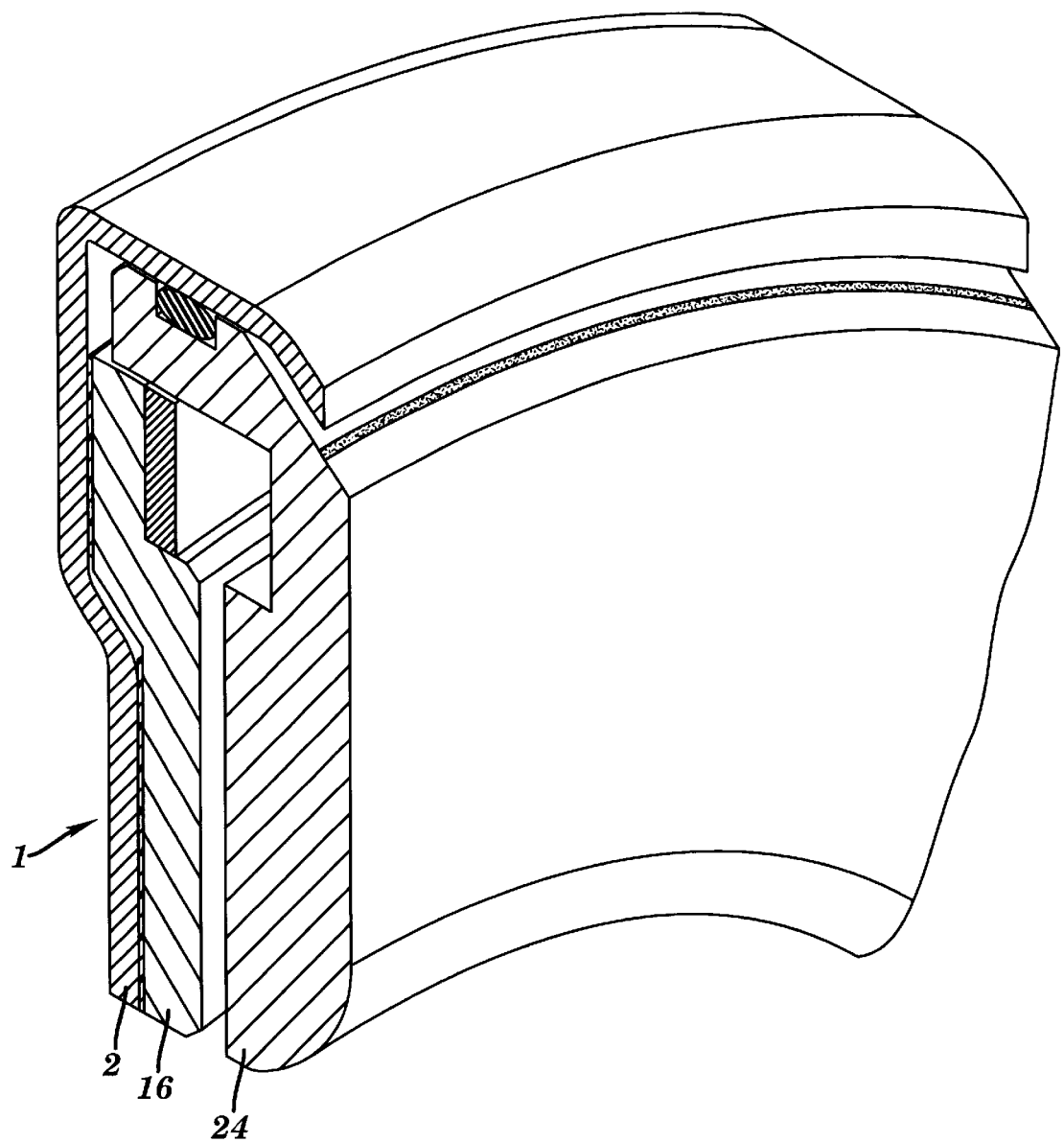
FIG. 5 shows the same bearing assembly portion as shown in FIG. 4, but at a point when the spring is partially compressed.
Figure 6:
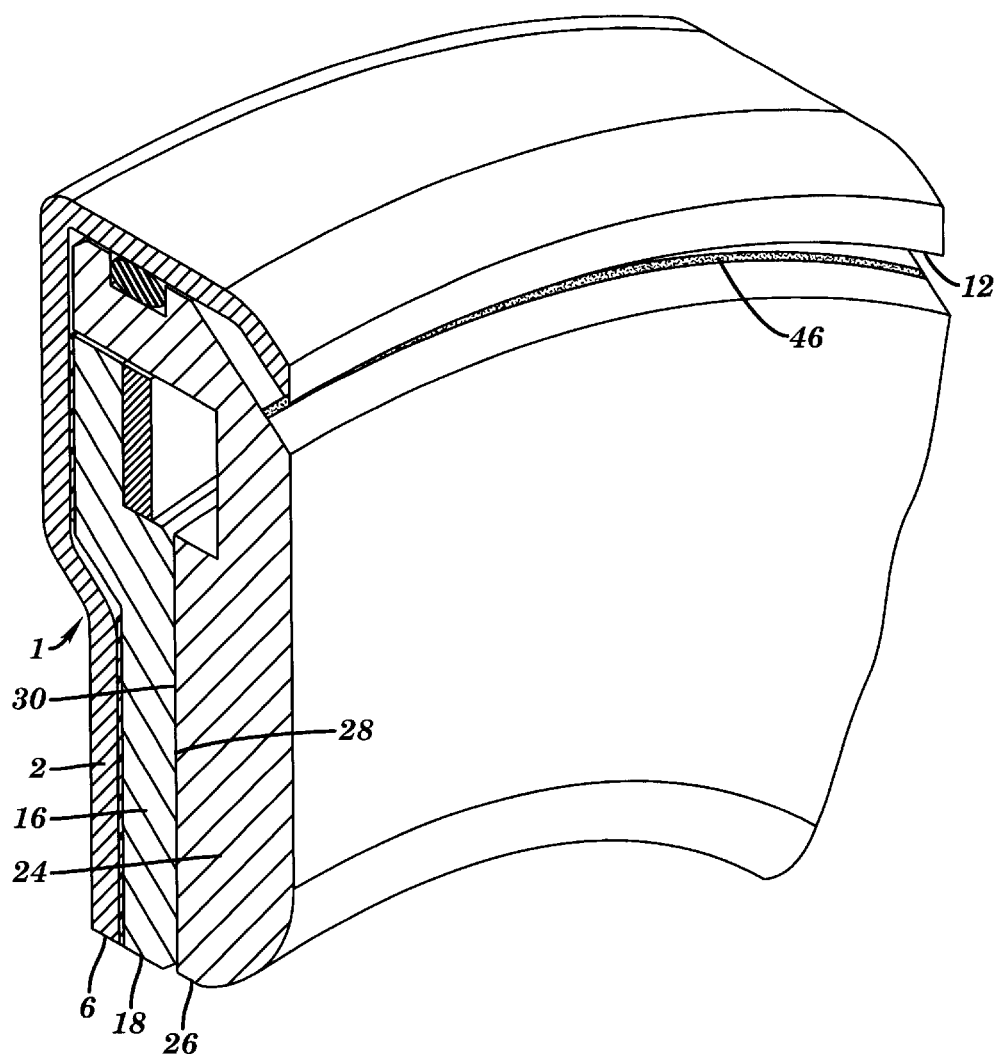
FIG. 6 shows the same bearing assembly portion as shown in FIG. 4, but at a point when the spring is at its maximum compression.

A spring member 32 is sandwiched between thrust members 16 and 24 and functions to spread apart said thrust members when the external loading of the bearing is low. The spring member is located at least partially within an annular groove 34 in surface 28 of the thrust member 24. The groove features sidewalls 36 that preferably extend parallel to each other. FIGS. 4–6 show the spring member in three different stages of compression. One should note that the width of the assembly 1, in a direction parallel to its center axis, changes in inverse proportion with spring compression, from a maximum shown in FIG. 4 to a minimum shown in FIG. 6.

In this embodiment of the invention, the spring member 32 is shown in the form of a conventional gap-type wave spring, also known as a wave washer. The washer preferably features three oscillations or waves that interrupt its planar shape. A fewer or greater number of waves/oscillations may be employed. Alternatively, other types of conventional spring members, including, but not limited to, Belleville washers, coil springs, or resilient materials, may be used in lieu of the shown wave washer. However, a wave washer does provide the advantages of simplicity, durability and a minimal space envelope. The spring member 32 may be made of a spring steel or other high-strength and/or high-resiliency material or structure. It should also be noted that while one spring member 32 is shown, a spring structure/ spring having multiple identical or dissimilar, connected or independent spring members may alternatively be employed to spring bias at least one and preferably both of the second and third thrust members.

As another alternative that is not shown, the spring member may be located between said thrust members 16 and 24 but not reside within a complementary groove. While the spring member is shown sandwiched between thrust members 16 and 24, an embodiment of the invention that is not shown may locate the spring member exterior to the thrust members and be operatively engaged to thrust member 24. The spring member would then cause thrust member 24 to move in response to physical changes in the spring.

Located in a peripheral groove 40 in the third thrust member 24 is an optional seal member 42. The seal member is preferably in the form of an o-ring and is made of a flexible lubricated rubber or synthetic rubber material, such as VITON. Other well known conventional sealing materials, for example natural rubber, nylon, etc. may be employed for the seal member 42. When the bearing assembly 1 is in its assembled form, the seal member 42 becomes sandwiched between the periphery of the third thrust member and an interior facing surface 44 of the first thrust member's peripheral portion 10. The seal member functions to prevent foreign matter from entering into the lubricated interior area of the assembly. It should be noted that by wrapping about and capturing the thrust assembly 20, the first thrust member 2 secures together the entire bearing assembly 1.

It should be noted from FIGS. 4–6 that as the spring member becomes compressed, the inwardly-extending peripheral portion of the third thrust member moves toward, but does not contact, surface 8. At the same time, said portion slides over, but does not contact, the outer perimeter of the second thrust member.

An additional, optional feature that may be incorporated into the bearing assembly 1 is an indication system capable of visibly indicating the amount of preload that is applied to the assembly and/or thickness changes in the pads 22 due to wear. This is accomplished through the placement of indicia 46 onto the outer, beveled surface 48 of the third thrust member 24. The indicia is painted or machined into surface 48, and is preferably conventional in appearance, such as a line or one or more arrows.

The basis for the preload indicating system is that the amount of the beveled surface 48 that extends outwardly of the tip portion 12 of the first thrust member 2 is dependent on the amount that the spring member 32 is compressed. In FIG. 4, the bearing assembly is shown in an unloaded condition. As such, the indicia 46 is spaced from the end of tip portion 12 by a noticeable distance. As an external load is applied to the third thrust member 24, the spring member 32 is compressed and thrust member 24, along with indicia 46, will move inwardly toward thrust member 2. FIG. 5 shows the assembly 1 at a point where the bearing loading has reached a first predetermined amount, such as a desired pre-load. As shown, the indicia 46 is still exposed, but is now located directly adjacent the end of tip portion 12. In this manner, when the bearing assembly 1 is installed in a structure where the indicia is visible, a user merely has to check the position of the indicia 46 to ensure that the bearing has been preloaded properly. It should be noted that other locations or forms of indicia may be substituted for the shown indicia 46. As one example, a pointer arrow can be mounted on the first thrust member 2, and the correct preload will be indicated when the plane of the exterior flat surface 50 of the third thrust member 24 becomes even with the end of the arrow.

The basis for a system to indicate pad wear also depends on the amount of the beveled surface 48 that extends outwardly of the first thrust member's tip portion 12. As noted previously, FIG. 6 shows the bearing in a fully compressed state. As an alternative, the indicia 46 may instead be located on surface 48 whereby, when the pads are new and the bearing is fully compressed, the indicia will be completely exposed, but proximate tip portion 12. As pads 22 wear down, a decreasing amount of surface 48 will be visible when the bearing is fully compressed. As a result, the visible portion of indicia 48 will indicate pad wear as it becomes reduced, and eventually covered by the end of tip portion 12. In this manner, an operator will be able to view the exterior of the bearing and thereby determine whether the pads have worn to the point where they, or the bearing, should be replaced.

Figure 7:
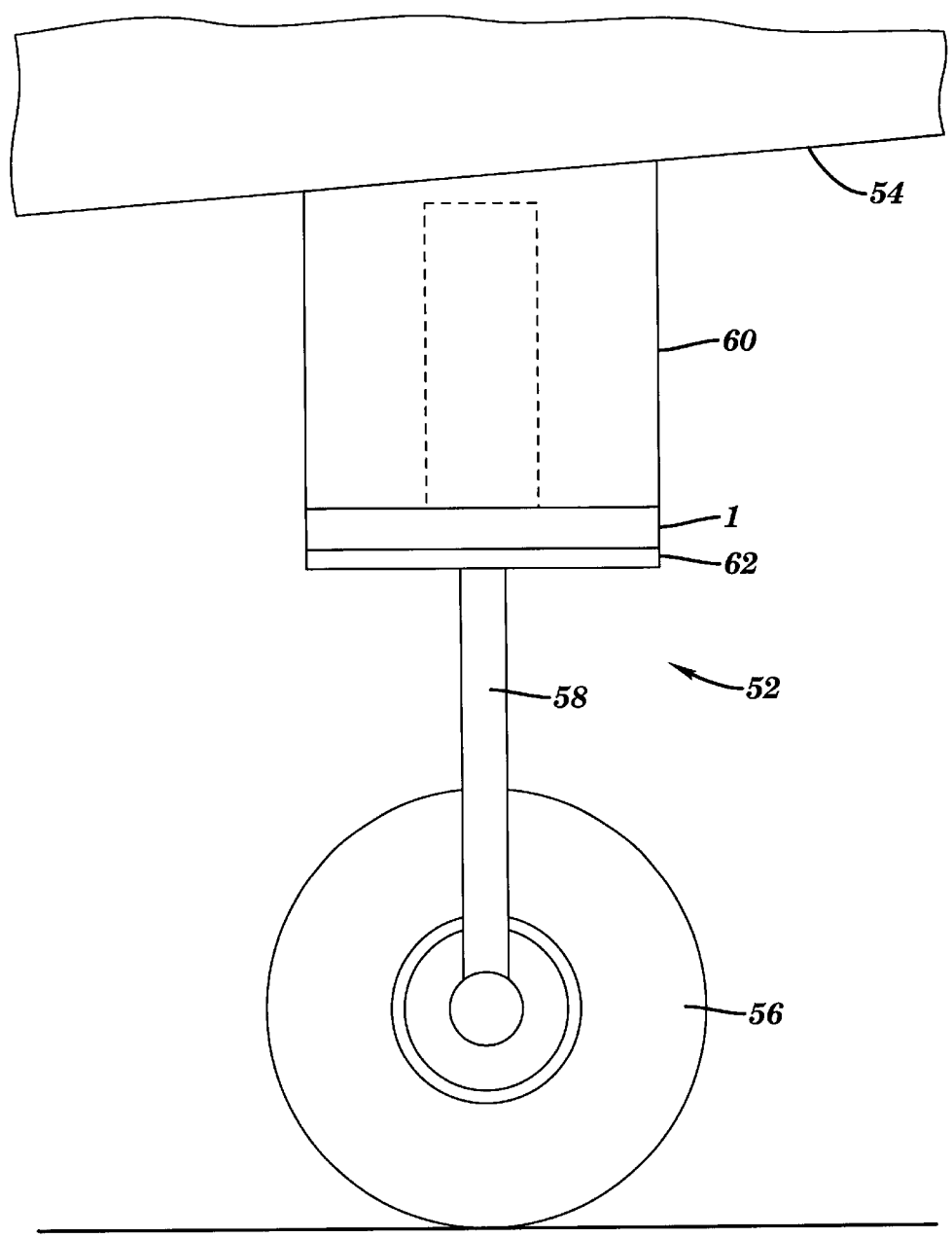
FIG. 7 is a generalized view of an airplane's nose gear that includes the bearing assembly shown in FIG. 1.

FIG. 7 provides a side view of one application for the bearing assembly 1. Shown in the figure is a generalized representation of a nose gear 52 extending downwardly from the underside 54 of a typical airplane, such as a jet airliner or a small propeller-driven airplane. The nose gear includes a rotatable wheel 56 that is secured to a lower support member/strut 58. The lower support member is rotatable within an upper support member/strut 60 to enable steering of the wheel 56 when the airplane is moving on the ground. As shown, the bearing assembly 1 is located between said upper and lower support members. In this example, the assembly 1 is oriented so that the third thrust member 24 contacts a flange portion 62 of the lower support member 58, and the first thrust member 2 contacts a bottom portion of the upper support member 60.

The operation of the bearing 1 will be described in relation to the example of usage provided in FIG. 7. It should be noted that the bearing assembly can be used in other applications, including land vehicle steering systems, heavy machinery, etc.

When a plane initially taxis down a runway, the nose gear 52 is supporting a significant portion of the airplane's weight. During this period, the bearing assembly's spring member 32 is in the condition depicted in FIG. 6 whereby the spring member is compressed to the point where surface 28 of thrust member 24 fully contacts surface 30 of the second thrust member 16. In so doing, friction between surfaces 28 and 30 is much greater than between the lubricated bearing surfaces 8 and 14, thereby essentially locking together the second and third thrust members.

As the plane picks up speed, the wings produce lift and the pilot, at the proper time, pulls back on the yoke and causes the plane's nose to lift. It is from this point, when the wheel(s) of the nose gear are still spinning but are carrying little or none of the plane's weight, that vibration in the nose gear can occur. However, it is also at this point that the spring member 32 overcomes the compressive force exerted by the now reduced amount of the plane's weight on the nose gear. The spring member expands and forces apart the second and third thrust members, possibly to the extent shown in FIGS. 4 and 5. This maintains the bearing's contact with adjacent structure, and at least partially loads the bearing and preferably also said adjacent structure. This mitigates or eliminates the creation of vibration in the nose gear.

Figure 9:
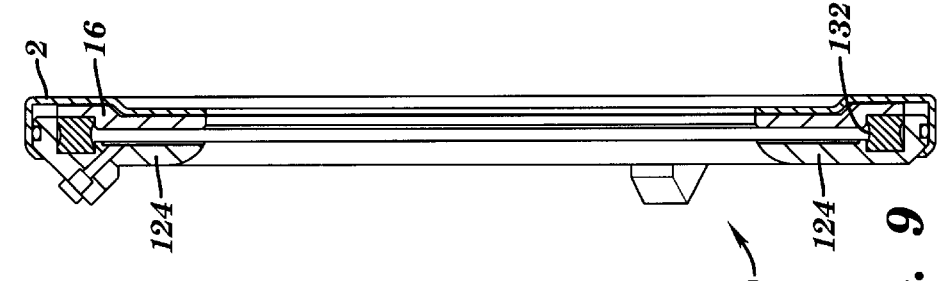
FIG. 9 is a cross-sectional side view of the bearing assembly shown in FIG. 8, taken at the plane indicated by 9—9.
Figure 10:
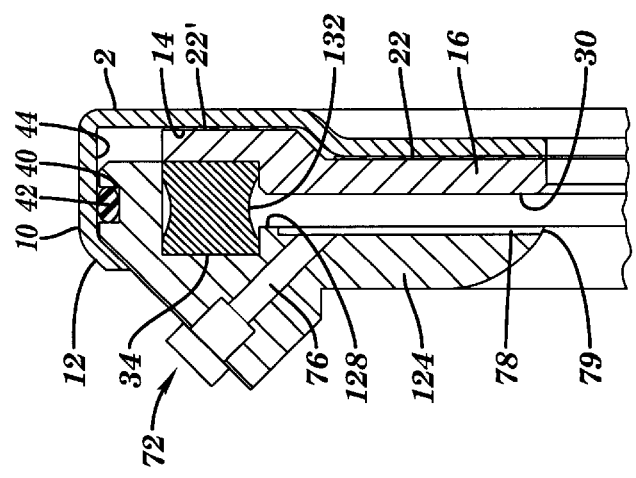
FIG. 10 is an enlarged view of the top portion of the bearing assembly shown in FIG. 9.
Figure 8:
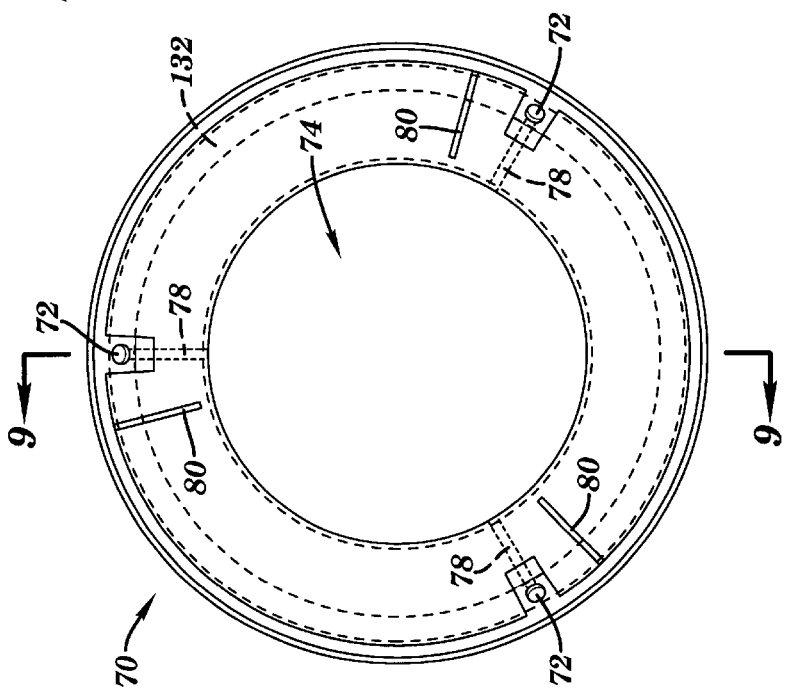
FIG. 8 is a front view of a second embodiment of a bearing assembly in accordance with the invention.

FIGS. 8–10 provide various views of a second embodiment of a bearing assembly 70 in accordance with the invention. The assembly 70 is structurally similar to the bearing assembly 1, and can be used interchangeably with said assembly. However, there are two primary differences between the bearing assemblies. Firstly, while both bearing assemblies employ a resilient spring member, bearing assembly 70 is shown employing a spring member 132 made of an elastomeric material. Secondly, bearing assembly 70 incorporates a grease injection system. The system enables a user to insert grease into the assembly and thereby preferably onto at least one surface adjacent the assembly. This increases the corrosion resistance of the bearing assembly and preferably of the at least one surface adjacent the assembly. The grease also acts to further seal the bearing assembly against the entry of any foreign matter. To facilitate the insertion of grease into the bearing assembly, the assembly includes at least one grease fitting 72.

FIG. 8 provides a front view of the bearing assembly 70. In this view, one can see that assembly 70 is ring-shaped with a center opening 74. The spring member 132 is shown in phantom.

FIG. 9 provides a cross-sectional side view of bearing assembly 70. In FIG. 10, an enlarged view of the top portion of FIG. 9 is provided. In these views, one can see that the assembly 70 includes first and second thrust members. 2 and 16 respectively, that are structurally and functionally identical to the first and second thrust members, 2 and 16 respectively, of bearing assembly 1.

As in the first embodiment, two circular pads 22 and 22' of a lubricating material, preferably a synthetic fluorine-containing resin material such as TEFLON, are preferably located between the bearing surfaces of the first and second thrust members. The pads function to minimize wear and friction when either of said members rotates relative to the other. It should be noted that a lubricating material that is not in pad form, such as grease or oil, may be employed in lieu of the self-lubricating pads 22. While the use of a quantity of lubricating material is preferred, certain conditions or material choices may make the use of a lubricant unnecessary.

Bearing assembly 70 is also similar to bearing assembly 1 in that it includes a rigid, disk-shaped third thrust member 124. The third thrust member is located adjacent the second thrust member 16 and biased away from said thrust member by the spring member 132. Thrust member 124 is equivalent to thrust member 24 of bearing assembly 1 and similarly features an interior-facing surface 128 that is complementary in shape to a rear surface 30 of thrust member 16.

Spring member 132 functions to push apart the second and third thrust members when the external loading of the bearing is low. The spring member is preferably located at least partially within an annular groove 34 in the third thrust member. It should be noted that while the spring member 132 is shown located in groove 34, a groove is not absolutely required and the spring member may even be located exterior to one or both of thrust members 16 and 124. The only requirement for the spring member is that it should function to apply pressure, either directly or indirectly, to at least one of thrust members 16 and 124.

In this embodiment, the spring member 132 (equivalent to spring member 32 in the first embodiment) is shown in the form of an elastomeric ring. An elastomer is hereby defined as a non-metallic resilient material. In FIG. 10, the spring member is shown in a non-compressed state. In such a state, the spring member's cross-section resembles that of an hourglass. This shape enables the spring member to be compressed without damage since this allows room for portions of the spring member to expand without protruding beyond groove 34 in a direction toward the center of the bearing assembly.

The spring member 132 is preferably made of a material that is resistant to substances that it may encounter in its particular usage environment. When the bearing assembly is used in an aircraft landing gear, the spring member should be made of a material that is resistant to hydraulic oil, grease and water. One possible material to be used for spring member 132 is urethane. When the bearing assembly 70 is used in a landing gear, such as when it is employed in place of bearing assembly 1 in the example shown in FIG. 7, the spring load will typically be about 400 to 800 pounds.

The functionality of bearing assembly 70 is much the same as described for bearing assembly 1, wherein the assembly's width, measured in a direction parallel to the assembly's center axis, will decrease as the compression of the spring member 132 increases above a negligible amount. At low load conditions, the spring member 132 applies sufficient pressure to the thrust members to damp vibration and to ensure a tight fit between the bearing assembly 70 and any structure to which it is directly connected. It should also be noted that while one spring member 132 is shown, the spring member may also be called a spring or spring structure and be made of a single spring or multiple identical or dissimilar, connected or independent, springs.

Bearing assembly 70 is also similar to assembly 1 in that it optionally includes a seal member 42 located in a peripheral groove 40 in the third thrust member 124. The seal member is preferably in the form of an o-ring and is made of a flexible lubricated rubber or synthetic rubber material, such as VITON. Other well known conventional sealing materials, for example natural rubber, nylon, etc. may be employed for the seal member 42. When the bearing assembly 70 is in its assembled form, the seal member 42 becomes sandwiched between the periphery of the third thrust member and an interior facing surface 44 of the first thrust member's peripheral portion 10. The seal member functions to prevent foreign matter from entering into the lubricated interior area of the bearing assembly. It should be noted that by wrapping about and capturing the second and third thrust members, the first thrust member 2 secures together the entire bearing assembly 70 into a cartridge-type unit.

The grease injection system is used to insert grease or some other anti-corrosion material into the bearing assembly and preferably onto one or more surfaces adjacent the assembly. To facilitate injection of the grease, the third thrust member 124 is shown having a grease inlet in the form of three grease fittings 72. It should be noted that a lesser or greater number of grease fittings may be employed depending on the layout and/or size of the bearing, the environment to which the bearing will be exposed, and how accessible the bearing will be once it is installed. It should be noted that the grease fittings are preferably conventional in design and are preferably self-sealing.

A passage 76 connects each grease fitting to an associated elongated, radially-oriented groove 78 located in the inwardly-facing surface 128 of the third thrust member 124. The embodiment shown includes three grooves 78, all of which are shown in phantom in FIG. 8. When grease is injected into any of the grease fittings, the grease flows through the associated passage 76, through the associated groove 78 and then into the inner diameter/opening 74 of the bearing assembly via a grease outlet in the form of an open end 79 of the groove 78. It should be noted that the passage 76 and groove 78 are used for the embodiment shown and other manners of directing the grease to one or more areas interior and/or exterior to the bearing assembly may alternatively be employed.

Once the bearing assembly 70 is in an installed condition, for example placed in an aircraft landing gear in the same manner as shown for bearing assembly 1 in FIG. 7, other structures will be connected to the bearing assembly. If grease is then inserted into the assembly via one or more of the grease fittings 72, the grease will eventually flow onto one or more surfaces of structure located adjacent the bearing assembly via the bearing assembly's center opening 74. The grease will then not only function to provide a protective coating against corrosion to the bearing's interior surfaces and the surface(s) of structure adjacent the bearing, but will also seal the interior of the bearing assembly against the entry of contaminants.

To enable a person to determine when sufficient grease has been inserted into the bearing, the bearing includes at least one grease indication opening 80 that extends completely through the third thrust member 124. In the embodiment shown, three indication openings, in the form of elongated slots, are depicted.

When the bearing is installed and a technician then goes about charging bearing assembly 70 with grease, he or she will attach a charging device, such as a grease gun, to one of the grease fittings 72. Grease will then be injected into the bearing assembly where it will then flow via groove 78 into any areas adjacent the bearing assembly's center opening 74. Once these areas are substantially filled, the grease will start being expelled from the bearing assembly via the grease indicator opening 80 nearest the grease fitting being used. Once the technician sees the grease being expelled, he or she will then stop inserting grease into the fitting. The charging device will then be removed from the particular grease fitting and the procedure may be repeated using the other grease fittings.

The operation of the bearing assembly 70 is the same as previously described for bearing assembly 1. The first and second thrust members are designed to rotate relative to each other. Under a high load condition, the spring member 132 will be compressed sufficiently to enable the third thrust member 124 to engage the second thrust member 16 in a manner wherein it becomes substantially locked to the member 16. Under low or no load conditions, the spring member 132 applies pressure in a direct manner to the second and third thrust members wherein it biases said thrust members away from each other. It should be noted that when the bearing assembly is installed, the spring member will also indirectly apply pressure to the first thrust member. In this manner, pressure from the spring ensures that the first and third thrust members maintain their contact with adjacent structures. As a result, the spring member functions to prevent and/or reduce and/or damp vibration within the bearing assembly and in structure associated with the bearing assembly.

It should be noted that in both embodiments of the invention the first, second and third thrust members are all shown as round plates having a center-located thru-hole. Any or all of said members may be a different shape, have a different thru-hole diameter or location, or may not include a thru-hole at all. Furthermore, while a frictional engagement is taught between the second and third thrust members when the spring member 32 or 132 is at maximum compression, other forms of engagement may be employed. Additionally, when the bearing assembly 1 or 70 is in an unloaded condition, thrust member 24 or 124 will preferably not rotate relative to member 16. However, in the embodiments shown, such relative rotation is not physically prevented and is therefore allowable. Alternatively, the bearing assemblies 1 or 70 may include conventional structure to prevent such rotation, or may include lubrication between the second and third thrust members to facilitate such rotation. Furthermore, any modifications that were noted as being possible for each of the bearing assemblies 1 and 70 may be employed on either bearing assembly 1 and 70.

The preferred embodiments of the invention disclosed herein have been discussed for the purpose of familiarizing the reader with the novel aspects of the invention. Although preferred embodiments of the invention have been shown and described, many changes, modifications and substitutions may be made by one having ordinary skill in the art without necessarily departing from the spirit and scope of the invention as described in the following claims.

I claim:

1. A bearing assembly comprising:
    a first thrust member, wherein said member has a bearing surface and is capable of being connected to an external structure;
    a second thrust member, wherein said second thrust member has a bearing surface that at least partially faces the bearing surface of said first thrust member and is located proximate the bearing surface of said first thrust member, and wherein at least one of said first and second thrust members is rotatable relative to the other of said thrust members;
    a third thrust member, wherein said third thrust member is capable of being connected to an external structure and is located whereby said second thrust member is situated at least partially between said first and third thrust members; and
    a spring operatively connected to at least one of said second and third thrust members, wherein said spring is made of a resilient material, wherein when said spring is in a first state of compression, it causes said third thrust member to be spaced from said second thrust member by a first distance, and wherein if a compressive force is applied to the bearing assembly in a direction whereby said force urges said second and third thrust members toward each other whereby said spring becomes compressed to a second state of compression that is greater than said first state of compression whereby the distance between the second and third thrust members becomes less than said first distance and the third thrust member engages the second thrust member in a manner whereby rotative force can be transferred between said second and third thrust members and wherein if said compressive force is greater than a minimum required to compress said spring to said second state of compression, said spring will substantially remain in said second state of compression as a portion of said compressive force bypasses said spring and travels from one of said second and third thrust members to the other of said second and third thrust members.

2. The bearing assembly of claim 1 wherein said spring is made of an elastomeric material.

3. The bearing assembly of claim 2 wherein the spring is received within an annular groove in one of said thrust members.

4. The bearing assembly of claim 2 further comprising a lubricating material located whereby it can facilitate relative rotation between said first and second thrust members.

5. The bearing assembly of claim 2 further comprising indicia that visually indicates an amount of compression of the spring, wherein said indicia is in the form of a line located on a portion of the third thrust member that is visible when said spring is in said first state of compression, wherein when said spring is further compressed from said first state of compression, said line will move closer to said first thrust member.

6. The bearing assembly of claim 2 wherein said first thrust member includes a peripheral portion that at least partially surrounds said second and third thrust members and functions to secure together all of said thrust members into a cartridge-type unit.

7. The bearing assembly of claim 6 further comprising a seal member located between said peripheral portion of said first thrust member and a peripheral portion of the third thrust member.

8. The bearing assembly of claim 7 wherein the third thrust member includes a peripheral groove into which said seal member is at least partially received.

9. The bearing assembly of claim 2 wherein when said spring is in said first state of compression, said spring will have a cross-sectional shape that resembles an hour-glass.

10. The bearing assembly of claim 2 wherein the spring is made of a urethane material.

11. A bearing assembly comprising:
a first thrust member, wherein said first thrust member has a bearing surface and is capable of being connected to an external structure;
a second thrust member that has a bearing surface that at least partially faces the bearing surface of said first thrust member, wherein relative movement between said first and second thrust members is allowed in a first direction about a predetermined axis of rotation, and wherein said axis of rotation extends through an area at least partially surrounded by at least one of said bearing surfaces;
a third thrust member, wherein said third thrust member is capable of being connected to an external structure and is located whereby said second thrust member is situated at least partially between said first and third thrust members;
a spring made of an elastomeric material, wherein said spring at least partially surrounds said axis of rotation and is operatively connected to said second and third thrust members whereby said spring continually urges said second thrust member toward said first thrust member, wherein when said spring is in a first state of compression, it causes said third thrust member to be spaced from said second thrust member by a first distance, and wherein when said spring is in a predetermined second state of compression that is greater than said first state of compression, the third thrust member will contact and thereby become operatively engaged to said second thrust member; and
wherein if the first thrust member is allowed to rotate in said first direction relative to the second thrust member, said first thrust member will rotate about said axis of rotation, and wherein if the second and third thrust members are operatively engaged and are allowed to rotate in said first direction relative to said first thrust member, both of said second and third thrust members will rotate about said axis of rotation.

12. The bearing assembly of claim 11 wherein the spring is received within an annular groove in one of said thrust members.

13. The bearing assembly of claim 11 further comprising a lubricating material located whereby it can facilitate relative rotation between said first and second thrust members.

14. The bearing assembly of claim 11 further comprising indicia that visually indicates an amount of compression of the spring, wherein said indicia is in the form of a line located on a portion of the third thrust member that is visible when said spring is in said first state of compression, wherein when said spring is further compressed from said first state of compression, said line will move closer to said first thrust member.

15. The bearing assembly of claim 11 wherein said first thrust member includes a peripheral portion that at least partially surrounds said second and third thrust members and functions to secure together all of said thrust members into a cartridge-type unit.

16. The bearing assembly of claim 15 further comprising a seal member located between said peripheral portion of said first thrust member and a peripheral portion of the third thrust member.

17. The bearing assembly of claim 11 wherein when said spring is in a first condition of compression, said spring will have a cross-sectional shape that resembles an hour-glass.

18. The bearing assembly of claim 11 wherein the spring is made of a urethane material.

19. A bearing assembly comprising:
a first thrust member, wherein said member has a bearing surface and is capable of being connected to an external structure;
a second thrust member, wherein said second thrust member has a bearing surface that at least partially faces the bearing surface of said first thrust member and is located substantially adjacent to the bearing surface of said first thrust member, and wherein at least one of said first and second thrust members is rotatable relative to the other of said thrust members;
a third thrust member, wherein said third thrust member is capable of being connected to an external structure and is located whereby said second thrust member is situated at least partially between said first and third thrust members;
a spring operatively connected to at least one of said second and third thrust members whereby when said spring is in a first state of compression, it causes said third thrust member to be spaced from said second thrust member by a first distance, and wherein if a compressive force of a predetermined magnitude is applied to the third thrust member in a direction whereby said force urges said third thrust member toward said second thrust member, it will cause said spring to be compressed to a second state of compression that is greater than said first state of compression whereby the distance between the second and third thrust members will become less than said first distance and the third thrust member will operatively engage the second thrust member whereby rotative force can be transferred between said second and third thrust members and at least a portion of said compressive force will bypass said spring as said force travels from the third thrust member to the second thrust member; and
a grease injection system that includes a grease inlet located in a portion of said bearing assembly, a grease outlet located in a portion of said bearing assembly, and wherein said grease injection system functions to enable grease to be inserted into said bearing assembly via said grease inlet where it can then be expelled from said bearing assembly via said grease outlet.

20. The bearing assembly of claim 19 wherein when said bearing assembly is connected to an external structure, grease injected into said bearing assembly via said grease inlet will be directed to flow out of said bearing assembly via said grease outlet whereby said grease will then at least partially coat a portion of said external structure.

21. The bearing assembly of claim 20 wherein said grease injection system further comprises a groove located on a surface of one of said thrust members and operatively connected to said grease inlet and to said grease outlet.

22. The bearing assembly of claim 21 wherein said grease outlet is located at an end of said groove and leads to an area adjacent to at least one of said thrust members.

23. The bearing assembly of claim 19 wherein at least one of said thrust members includes an opening through which grease will flow when grease is being inserted into said grease inlet and said grease fills a predetermined area.

24. The bearing assembly of claim 23 wherein said opening extends through said third thrust member.

25. A bearing assembly comprising:
a first thrust member, wherein said member has a bearing surface and is capable of being connected to an external structure;
a second thrust member, wherein said second thrust member has a bearing surface that at least partially faces the bearing surface of said first thrust member and is located proximate the bearing surface of said first thrust member, and wherein at least one of said first and second thrust members is rotatable relative to the other of said thrust members;

a third thrust member, wherein said third thrust member is capable of being connected to an external structure and is located whereby said second thrust member is situated at least partially between said first and third thrust members;

a spring operatively connected to at least one of said second and third thrust members, wherein said spring is made of a resilient material, wherein when said spring is in a first state of compression, it causes said third thrust member to be spaced from said second thrust member by a first distance, and wherein when said spring is in a predetermined second state of compression that is greater than said first state of compression, the distance between the second and third thrust members will be less than said first distance and the third thrust member will engage the second thrust member in a manner whereby rotative force can be transferred between said second and third thrust members; and a seal member located between said peripheral portion of said first thrust member and a peripheral portion of the third thrust member.

26. A bearing assembly comprising:

a first thrust member, wherein said member has a bearing surface and is capable of being connected to an external structure;

a second thrust member, wherein said second thrust member has a bearing surface that at least partially faces the bearing surface of said first thrust member and is located proximate the bearing surface of said first thrust member, and wherein at least one of said first and second thrust members is rotatable relative to the other of said thrust members;

a third thrust member, wherein said third thrust member is capable of being connected to an external structure and is located whereby said second thrust member is situated at least partially between said first and third thrust members;

a spring operatively connected to at least one of said second and third thrust members, wherein said spring is made of a resilient material, wherein when said spring is in a first state of compression, it causes said third thrust member to be spaced from said second thrust member by a first distance, and wherein when said spring is in a predetermined second state of compression that is greater than said first state of compression, the distance between the second and third thrust members will be less than said first distance and the third thrust member will engage the second thrust member in a manner whereby rotative force can be transferred between said second and third thrust members; and wherein the third thrust member includes a peripheral groove into which said seal member is at least partially received.

27. A bearing assembly comprising:

a first thrust member, wherein said member has a bearing surface and is capable of being connected to an external structure;

a second thrust member, wherein said second thrust member has a bearing surface that at least partially faces the bearing surface of said first thrust member and is located substantially adjacent to the bearing surface of said first thrust member, and wherein at least one of said first and second thrust members is rotatable relative to the other of said thrust members;

a third thrust member, wherein said third thrust member is capable of being connected to an external structure and is located whereby said second thrust member is situated at least partially between said first and third thrust members;

a spring operatively connected to at least one of said second and third thrust members whereby when said spring is in a first state of compression, it causes said third thrust member to be spaced from said second thrust member by a first distance, and wherein when said spring is in a predetermined second state of compression that is greater than said first state of compression, the distance between the second and third thrust members will be less than said first distance and the third thrust member will operatively engage the second thrust member;

a grease injection system that includes a grease inlet located in a portion of said bearing assembly, a grease outlet located in a portion of said bearing assembly, and wherein said grease injection system functions to enable grease to be inserted into said bearing assembly via said grease inlet where it can then be expelled from said bearing assembly via said grease outlet;

wherein when said bearing assembly is connected to an external structure, grease injected into said bearing assembly via said grease inlet will be directed to flow out of said bearing assembly via said grease outlet whereby said grease will then at least partially coat a portion of said external structure; and wherein said grease injection system further comprises a groove located on a surface of one of said thrust members and operatively connected to said grease inlet and to said grease outlet.

* * * * *